US010893237B2

(12) United States Patent
Liang et al.

(10) Patent No.: US 10,893,237 B2
(45) Date of Patent: Jan. 12, 2021

(54) METHOD AND SYSTEM FOR MULTI-GROUP AUDIO-VIDEO INTERACTION (71) Applicant: Wangsu Science & Technology Co., Ltd., Shanghai (CN)

(72) Inventors: Shiping Liang, Shanghai (CN); Xin Xiao, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/689,072

(22) Filed: Nov. 19, 2019

(65) Prior Publication Data
US 2020/0366868 A1    Nov. 19, 2020

Related U.S. Application Data (63) Continuation of application No. PCT/CN2019/090341, filed on Jun. 6, 2019.

(30) Foreign Application Priority Data

May 17, 2019 (CN) .......................... 2019 1 0414946

(51) Int. Cl.
H04N 7/15 (2006.01)
H04L 29/06 (2006.01)
(52) U.S. Cl.
CPC ......... H04N 7/157 (2013.01); H04L 65/1093 (2013.01); H04L 65/4015 (2013.01)
(58) Field of Classification Search
USPC ................. 348/14.01, 14.09, 14.02
See application file for complete search history.

(56) References Cited

U.S. PATENT DOCUMENTS 7,478,129 B1 *   1/2009  Chemtob ............ H04L 12/1827
                                                    709/204
2002/0019829 A1 *  2/2002  Shapiro .................. H04L 67/16
(Continued)

FOREIGN PATENT DOCUMENTS

CN     1889722 A    1/2007
CN     1905466 A    1/2007
(Continued)

OTHER PUBLICATIONS

First Office Action for corresponding Chinese application No. CN201910414946.5, dated Dec. 26, 2019, 11 pages total.
(Continued)

Primary Examiner — Maria El-Zoobi (57) ABSTRACT

The present disclosure provides a method for multi-group audio-video interaction, including: receiving a virtual group creation request initiated by a first user, creating a first virtual group, and determining a first session group the first user belonging to; associating the first session group with the first virtual group, and adding all session users in the first session group to the first virtual group; determining a second session group a second user belonging to, when receiving a virtual group join request initiated by the second user; associating the second session group with the first virtual group, and adding all session users in the second session group to the first virtual group; and sending a user list of the second session group to other session users in the first virtual group, to enable the other session users to incrementally pull and play an audio-video stream according to the user list.

20 Claims, 4 Drawing Sheets

(56) References Cited

U.S. PATENT DOCUMENTS

| | | | | |
|---|---|---|---|---|
| 2002/0091872 A1* | 7/2002 | Bourke-Dunphy | ....... | G06F 8/61 719/316 |
| 2006/0036456 A1* | 2/2006 | Wu | ........................ | G06N 5/022 706/50 |
| 2007/0220092 A1* | 9/2007 | Heitzeberg | .............. | H04L 51/04 709/204 |
| 2010/0095009 A1* | 4/2010 | Matuszewski | ........ | H04L 67/306 709/228 |
| 2010/0306354 A1* | 12/2010 | DeHaan | .............. | H04L 41/0806 709/222 |
| 2012/0284637 A1* | 11/2012 | Boyer | .................. | G06Q 10/109 715/751 |
| 2013/0155169 A1* | 6/2013 | Hoover | .................. | H04N 7/157 348/14.02 |
| 2013/0297690 A1* | 11/2013 | Lucero | ................. | G06Q 10/101 709/204 |
| 2013/0339438 A1 | 12/2013 | Cherian et al. | | |
| 2017/0099389 A1* | 4/2017 | George | ............. | H04M 3/42195 |
| 2019/0058608 A1* | 2/2019 | Manuel-Devadoss | ....................... | H04L 12/185 |
| 2019/0279317 A1* | 9/2019 | Burton | .................... | H04L 51/16 |

FOREIGN PATENT DOCUMENTS

| | | |
|---|---|---|
| CN | 101106536 A | 1/2008 |
| CN | 101410821 A | 4/2009 |
| CN | 103888344 A | 6/2014 |
| CN | 105530165 A | 4/2016 |
| CN | 106302121 A | 1/2017 |

OTHER PUBLICATIONS

Second Office Action for corresponding Chinese application No. CN201910414946.5, dated Jul. 15, 2020, 11 pages total.

International Search Report for corresponding PCT application No. PCT/CN2019/090341, dated Feb. 19, 2020, 4 pages total.

* cited by examiner

METHOD AND SYSTEM FOR MULTI-GROUP AUDIO-VIDEO INTERACTION

CROSS-REFERENCE TO RELATED APPLICATIONS

The present disclosure is a continuation of international application No. PCT/CN2019/090341, filed on Jun. 6, 2019, and titled "METHOD AND SYSTEM FOR MULTI-GROUP AUDIO-VIDEO INTERACTION", which is incorporated herein by reference in its entirety. The PCT application claims the priority of the Chinese patent application No. 201910414946.5 titled "METHOD AND SYSTEM FOR MULTI-GROUP AUDIO-VIDEO INTERACTION" filed on May 17, 2019, which is incorporated in its entirety into this disclosure by reference.

TECHNICAL FIELD

The present disclosure relates to Internet technology, especially to a method and a system for multi-group audio-video interaction.

BACKGROUND

With a continuously development of streaming technology, the group mode has become a currently popular mode of audio-video interaction. In the group mode, users in a group can perform audio-video interaction with each other as well as with administrators of other groups.

Specifically, if a group (that is, a group 1 below) wants to perform audio-video interaction with other groups, an administrator of the group 1 may send an audio-video interaction invitation to an audio-video interaction system of a service provider. Then, the audio-video interaction system may determine an administrator of a target group corresponding to the audio-video interaction invitation, disconnect audio-video interaction of the administrator of the target group, and add the administrator of the target group to the group 1. Afterward, an audio-video server may pull an audio-video stream of a user that performs audio-video interaction in the group 1 and an audio-video stream of the administrator of the target group, and send the audio-video streams to the audio-video interaction system. And the audio-video interaction system transmits the audio-video streams to the user that performs audio-video interaction in the group 1 and the administrator of the target group.

During the process of realizing the present disclosure, the inventor found that at least the following problems exist in existing technologies:

During multi-group audio-video interaction, only the administrator of the target group can join a group from which the audio-video interaction invitation is sent, and perform audio-video interaction with users in the group, other users in the target group cannot participate in the audio-video interaction, thereby leading to poor user experience.

SUMMARY

In order to overcome the above problem, some embodiments of the present disclosure provide a method and a system for multi-group audio-video interaction.

In a first aspect, a method for multi-group audio-video interaction is provided, and the method includes:

receiving, by an audio-video interaction system, a virtual group creation request initiated by a first user, creating a first virtual group, and determining a first session group to which the first user belongs;

associating, by the audio-video interaction system, the first session group with the first virtual group, and adding all session users in the first session group to the first virtual group;

determining, by the audio-video interaction system, a second session group to which a second user belongs, when receiving a virtual group join request for the first virtual group initiated by the second user;

associating, by the audio-video interaction system, the second session group with the first virtual group, and adding all session users in the second session group to the first virtual group; and sending, by the audio-video interaction system, a user list of the second session group to other session users that are in the first virtual group and not in the second session group, to enable the other session users not in the second session group to incrementally pull and play an audio-video stream according to the user list.

In a second aspect, a method for multi-group audio-video interaction applied to a group management layer is provided, and the method includes:

receiving a virtual group creation request initiated by a first user and sent by an access layer, creating a first virtual group, and determining a first session group to which the first user belongs;

associating the first session group with the first virtual group, and adding all session users in the first session group to the first virtual group;

determining a second session group to which a second user belongs, when receiving a virtual group join request for the first virtual group initiated by the second user and sent by the access layer;

associating the second session group with the first virtual group, and adding all session users in the second session group to the first virtual group; and sending a user list of the second session group to other session users that are in the first virtual group and not in the second session group, to enable the other session users not in the second session group to incrementally pull and play audio-video streams according to the user list.

In a third aspect, a method for multi-group audio-video interaction applied to an access layer is provided, and the method includes:

receiving a group operation request initiated by a session user, and performing permission verification on the session user; and providing the group operation request to a group management layer if the permission verification succeeds; or discarding the group operation request if the permission verification fails;

where the group operation request at least comprises a virtual group creation request, a virtual group join request, a virtual group exit request and a virtual group destruction request, and a join request and an exit request for a session group.

In a fourth aspect, a system for multi-group audio-video interaction is provided, and the system includes a group management layer configured to perform the method described in the second aspect and an access layer configured to perform the method described in the third aspect.

In a fifth aspect, a server is provided. The server includes a processor and a memory. The memory stores at least one instruction, at least one program, a code set or an instruction set, and the at least one instruction, the at least one program, the code set or the instruction set are loaded and executed by the processor to implement the method for multi-group audio-video interaction described in the first aspect.

In a sixth aspect, a computer readable storage medium is provided. The storage medium stores at least one instruction, at least one program, a code set or an instruction set, and the at least one instruction, the at least one program, the code set or the instruction set are loaded and executed by the processor to implement the method for multi-group audio-video interaction described in the first aspect.

The technical solutions provided in the embodiments of the present disclosure have the following advantages.

In this embodiment, an audio-video interaction system receives a virtual group creation request initiated by a first user, creates a first virtual group, and determines a first session group to which the first user belongs; the audio-video interaction system associates the first session group with the first virtual group, and adds all session users in the first session group to the first virtual group; the audio-video interaction system determines a second session group to which the second user belongs, when a virtual group join request for the first virtual group initiated by a second user is received; the audio-video interaction system associates the second session group with the first virtual group, and adds all session users in the second session group to the first virtual group; and the audio-video interaction system sends a user list of the second session group to other session users that are in the first virtual group and not in the second session group, to enable the other session users not in the second session group to incrementally pull and play an audio-video stream according to the user list. In this way, on the one hand, the audio-video interaction system may associate a plurality of session groups that perform cross-group audio-video interaction to a same virtual group, and add session users in the plurality of session groups that perform cross-group audio-video interaction to the virtual group, so that the cross-group audio-video interaction can be realized between all session users in each session group, and a plurality of users may simultaneously interact with each other, thereby effectively improving user experience. On the other hand, when performing cross-group audio-video interaction, each session user in the virtual group may directly pull and play audio-video streams of all session users that participate in the cross-group audio-video interaction, without disconnecting the interaction connection of the original session group, thereby further improving user experience.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION

In order to clarify the objective, the technical solutions and the advantages of the present disclosure, the embodiments of the present disclosure will be further described in details with reference to the accompanying drawings.

Figure 1:
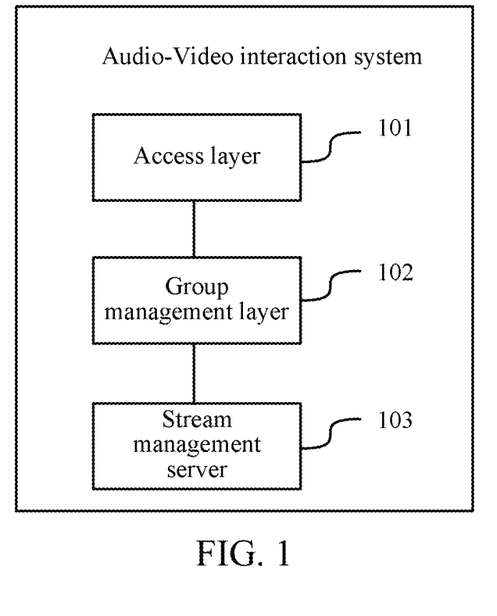
FIG. 1 is a schematic structural diagram of an audio-video interaction system provided in an embodiment of the present disclosure.

An embodiment of the present disclosure provides a method for multi-group audio-video interaction, and the method may be applied to an audio-video interaction system shown in FIG. 1. The audio-video interaction system may include an access layer 101, a group management layer 102 and a stream management server 103. The access layer 101 and the group management layer 102 may both be independent servers, or may be different components on a same server, or may be a service cluster including a plurality of servers. The audio-video interaction system may perform, based on a group operation request initiated by a session user, corresponding processing on a session group or a virtual group corresponding to the group operation request, and pull and play, for each session user in the session group and the virtual group, an audio-video stream of the session user by the stream management server 103. The access layer 101 may be configured to receive a group operation request for a session group or a virtual group sent by a session user, and forward the group operation request to the group management layer. The group management layer may be configured to receive the group operation request sent by the access layer 101, and manage the session group or the virtual group corresponding to the group operation request. The stream management server 103 may perform operations such as pulling, processing and pushing the audio-video stream of the session user.

Figure 2:
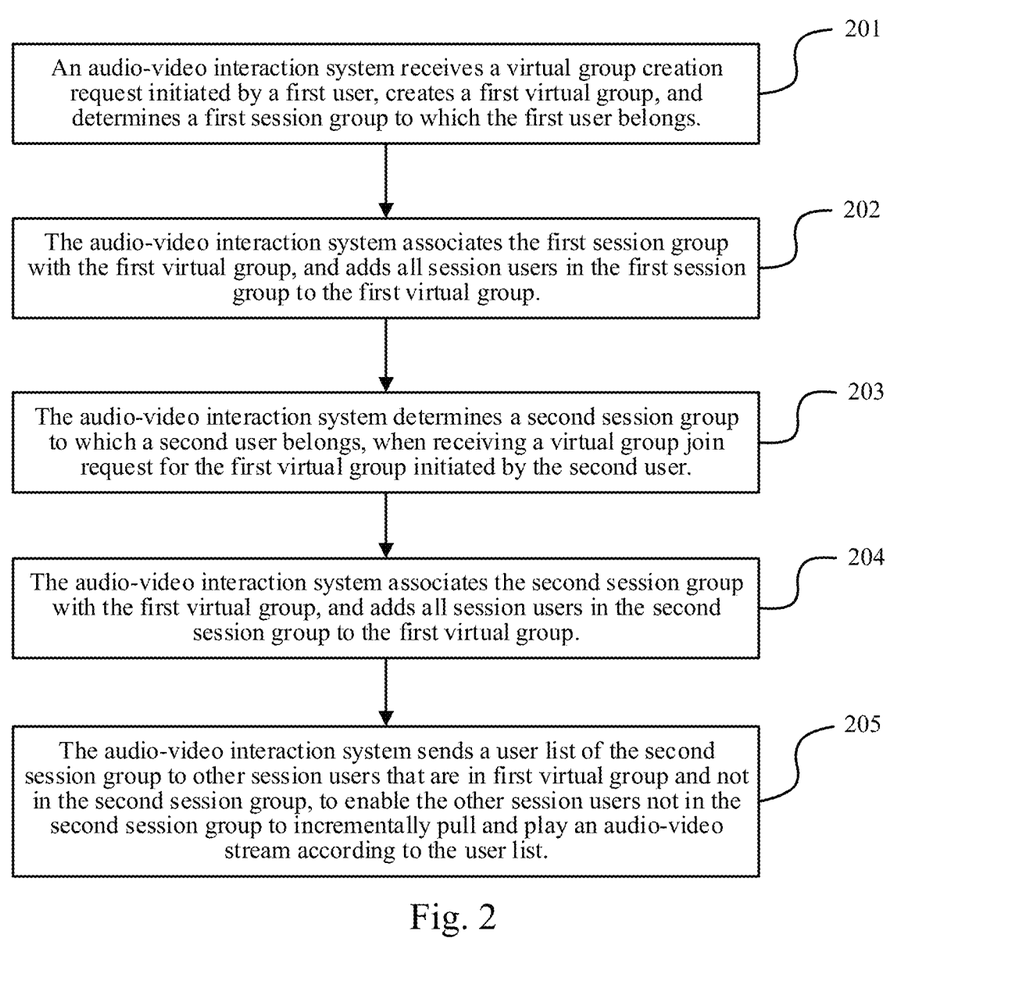
FIG. 2 is a flowchart of a method for multi-group audio-video interaction provided in an embodiment of the present disclosure.

Steps of a method for multi-group audio-video interaction as shown in FIG. 2 are described in detail below with reference to specific embodiments. The content may be as follows.

In step 201, an audio-video interaction system receives a virtual group creation request initiated by a first user, creates a first virtual group, and determines a first session group to which the first user belongs.

Figure 3:
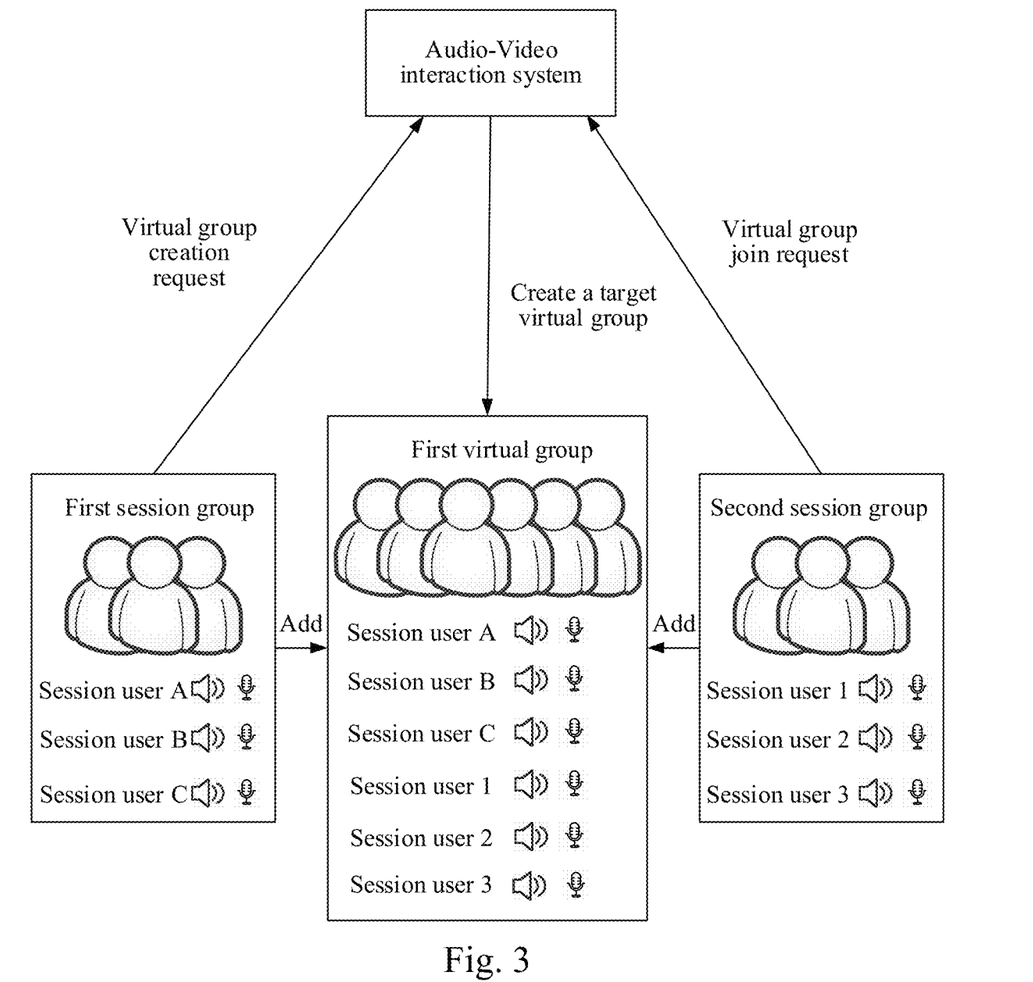
FIG. 3 is a scenario diagram of a method for multi-group audio-video interaction provided in an embodiment of the present disclosure.

In implementation, if a session user wants to perform audio-video interaction with other session users, the session user may create a session group and invite the other session users to join the session group, so that each session user in the session group may pull audio-video streams of the other session users in the session group and create a corresponding interaction window for each of the other session users to play the corresponding audio-video stream. When a session user creates or joins a session group or a virtual group, the audio-video interaction system may store a group number or a virtual group number which corresponds to the session group or the virtual group, and a user list which corresponds to the session group and includes user identifiers, stream-pulling addresses, and other related information of all session users in the session group. As shown in FIG. 3, when a session group needs to perform cross-group audio-video interaction with one or more other session groups, a session user (which may be referred to as a first user) in the session group may send, based on an HTTP RESTful API, a virtual group creation request to the audio-video interaction system, and the audio-video interaction system may create a corresponding virtual group (which may be referred to as a first virtual group). Then, the first user may send an audio-video interaction invitation to session users in the one or more other session groups, to enable the other session groups to join the first virtual group. Specifically, the first user may send the virtual group creation request to the audio-video interaction system, and after receiving the virtual group creation request initiated by the first user, the audio-video interaction system may create a first virtual group corresponding to the virtual group creation request, generate a virtual group number corresponding to the first virtual group, and feed back the virtual group number to the first user. In the meantime, the audio-video interaction system may also determine a session group (which may be referred to as a first session group) to which the first user belongs.

In step 202, the audio-video interaction system associates the first session group with the first virtual group, and adds all session users in the first session group to the first virtual group.

In implementation, after determining the first session group, the audio-video interaction system may associate the first session group with the first virtual group. Specifically, a group number of the first session group is first obtained, and the group number of the first session group is associated with a virtual group number of the first virtual group. Then, as shown in FIG. 3, the audio-video interaction system may add all session users in the first session group to the first virtual group, that is, to enable each session user in the first session group to receive an audio-video stream of each of other session users in the first virtual group, create a corresponding interaction window for each of the other session users in the first virtual group to play the audio-video stream, and upload the audio-video stream to the first virtual group.

In step 203, when receiving a virtual group join request for the first virtual group initiated by a second user, the audio-video interaction system determines a second session group to which the second user belongs.

In implementation, as shown in FIG. 3, when another session group than the first session group need to join the first virtual group and perform cross-group audio-video interaction with all session groups in the first virtual group, a session user (which may be referred to as a second user) in the another session group may initiate a virtual group join request for the first virtual group to the audio-video interaction system, and after receiving the virtual group join request, the audio-video interaction system may determine a session group (which may be referred to as a second session group) to which the second user belongs. It can be understood that the second user may request to join the first virtual group by searching for the virtual group number of the first virtual group, or request to join the first virtual group after receiving an audio-video interaction invitation initiated by a session user in the first session group.

In step 204, the audio-video interaction system associates the second session group with the first virtual group, and adds all session users in the second session group to the first virtual group.

In implementation, after determining the second session group to which the second user belongs, the audio-video interaction system may obtain a group number of the second session group, and associate a group number of the second session group with the group number of the first virtual group. Then, as shown in FIG. 3, the audio-video interaction system may add all session users in the second session group to the first virtual group, that is, to enable each session user in the second session group to receive an audio-video stream of each of other session users that are in the first virtual group and not in the second session group, create a corresponding interaction window for each of the other session users in the first virtual group to play the audio-video stream, and upload the audio-video stream to the first virtual group.

In step 205, the audio-video interaction system sends a user list of the second session group to other session users that are in first virtual group and not in the second session group, to enable the other session users not in the second session group to incrementally pull and play an audio-video stream according to the user list.

In implementation, after adding all the session users in the second session group to the first virtual group, the audio-video interaction system may obtains a user list of the second session group, where the user list at least includes user identifiers, stream-pulling addresses, and other user information of all the session users in the second session group. Then, the audio-video interaction system may generate a notification message carrying the user list of the second session group, and send the notification message to the other session users that are in the first virtual group and not in the second session group. Afterward, the other session users that are in the first virtual group and not in the second session group may incrementally pull an audio-video stream of each session user in the user list of the second session group, and create a corresponding interaction window for each session user in the user list of the second session group to play the audio-video stream, thereby achieving seamless switching from a scenario in which session users in a single session group perform audio-video interaction with each other to a scenario in which session users in different groups perform cross-group audio-video interaction with each other.

Alternatively, the audio-video interaction system may remove, based on a virtual group exit request of a session user, all session users in a session group to which the session user belongs from a virtual group. Corresponding processing may be as follows: when receiving a virtual group exit request for the first virtual group initiated by a third user, the audio-video interaction system determines a third session group to which the third user belongs; the audio-video interaction system dissociates the third session group from the first virtual group, and removes all session users in the third session group from the first virtual group; and the audio-video interaction system sends a user list of the third session group to other session users that are in the first virtual group and not in the third session group, to enable the other session users not in the third session group to stop pulling an audio-video stream of the third session group.

In implementation, if a session group (which may be referred to as a third session group) in the first virtual group needs to exit from the first virtual group, a session user (which may be referred to as a third user) in the third session group may send a virtual group exit request for the first virtual group to the audio-video interaction system. Then, after receiving the virtual group exit request, the audio-video interaction system may determine the third session group to which the third user belongs. Afterward, the audio-video interaction system may obtain a group number of the third session group, dissociate the group number of the third session group from the virtual group number of the first virtual group, and remove all session users in the third session group from the first virtual group. Then, the audio-video interaction system may obtain a user list of the third session group, generate a notification message including the user list of the third session group, and send the notification message to other session users that are in the first virtual group and not in the third session group, to enable the other session users that are in the first virtual group and not in the third session group to stop pulling audio-video streams of session users in the third session group, and delete interaction windows corresponding to session users in the third session group. It can be understood that after exiting from the first virtual group, the session user of the third session group may have a single-group session based on an existing group session manner, that is, delete interaction windows of other session users that are not in the third session group, stop pulling corresponding audio-video streams, and only pull and play audio-video streams of session users in the third session group.

Alternatively, the audio-video interaction system may destruct the first virtual group according to a virtual group destruction request of a session user. Corresponding processing may be as follows: when receiving a virtual group destruction request for the first virtual group initiated by a fourth user, the audio-video interaction system determines all session groups that have been associated with first virtual group, and dissociates the first virtual group from all the session groups; and the audio-video interaction system deletes user data corresponding to the first virtual group, and sends a virtual group destruction message to each session user in the first virtual group, to enable each session user to stop pulling audio-video streams of other session groups in the first virtual group.

In implementation, when cross-group audio-video interaction based on the first virtual group ends, a session user (such as a fourth user) in the first virtual group may request to destruct the first virtual group. Specifically, the fourth user may send a virtual group destruction request for the first virtual group to the audio-video interaction system. After receiving the virtual group destruction request, the audio-video interaction system may determine the first virtual group corresponding to the virtual group destruction request and group numbers of all session groups that have been associated with the virtual group number of the first virtual group, and dissociate the group numbers of all the session groups that have been associated with the virtual group number of the first virtual group from the virtual group number of the first virtual group. Afterward, the audio-video interaction system may delete all user data such as a user list corresponding to the first virtual group, and send a destruction message for the first virtual group to each session user in the first virtual group. In this way, each of session users in each session group that originally belong to the first virtual group deletes interaction windows of all session users that are not in the session group to which the session user belongs, and stops pulling corresponding audio-video streams. That is, session users in each session group may still have a single-group session based on an existing group session manner, and only pull and play audio-video streams of session users in the session group to which the session user belongs.

Figure 4:
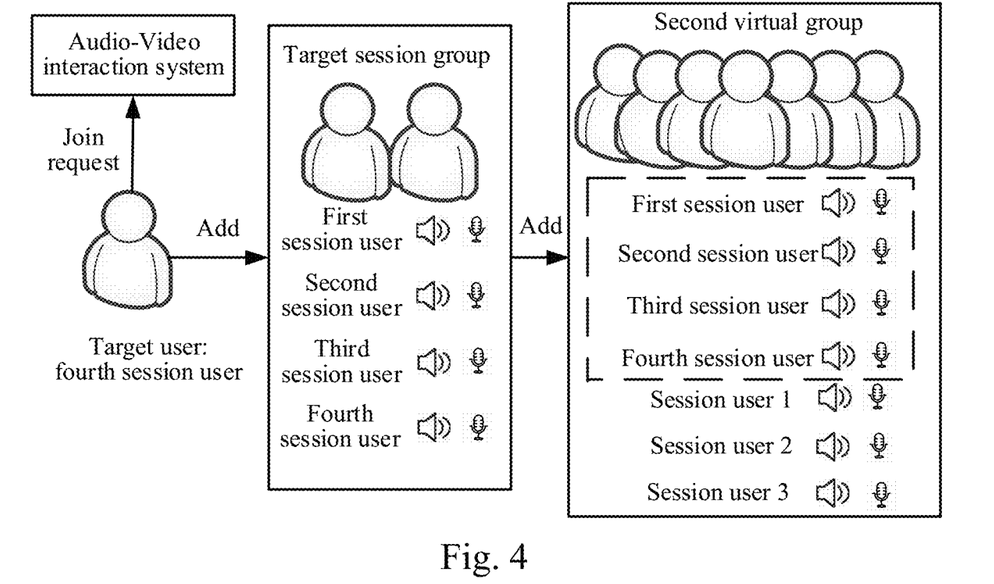
FIG. 4 is a scenario diagram of a method for multi-group audio-video interaction provided in another embodiment of the present disclosure.

Alternatively, the audio-video interaction system may add a session user that newly joins a session group to a virtual group associated with the session group. Corresponding processing may be as follows: when receiving a join request for a target session group initiated by a target user, the audio-video interaction system adds the target user to the target session group; if the target session group is associated with a virtual group, the audio-video interaction system adds the target user to a second virtual group associated with the target session group; and the audio-video interaction system sends a join message of the target user to other session users that are in the second virtual group and not in the target session group, to enable the other session users not in the target session group to pull and play an audio-video stream of the target user.

In implementation, as shown in FIG. 4, when a session user (which may be referred to as a target user) wants to join a session group (which may be referred to as a target session group), the session user may send a join request for the target session group to the audio-video interaction system, and after receiving the join request, the audio-video interaction system may add the target user to the target session group. In this way, other session users in the target session group than the target user may pull an audio-video stream of the target user, and create an interaction window for the target user to play the corresponding audio-video stream. The target user may also pull audio-video streams of all session users in the target session group except the target user, and create an interaction window for each session user in the target session group except the target user to play the corresponding audio-video stream. Then, the audio-video interaction system may obtain a group number of the target session group, and determine whether the group number of the target session group is associated with a virtual group number, to determine whether the target session group is associated with a virtual group. If the target session group is associated with a virtual group, the audio-video interaction system may add the target user to the virtual group (which may be referred to as a second virtual group) associated with the target session group, and generate a join message including a user identifier, a stream-pulling address and other user information of the target user and send the join message to other session users that are in the second virtual group and not in the target session group, to enable the other session users that are in the second virtual group and not in the target session group to pull an audio-video stream of the target user, and create an interaction window for the target user to play the audio-video stream of the target user.

Alternatively, the audio-video interaction system may remove users that exit a session group from a virtual group associated with the session group. Corresponding processing may be as follows: when receiving an exit request for a target session group initiated by a target user, the audio-video interaction system removes the target user from the target session group; if the target session group is associated with a virtual group, the audio-video interaction system removes the target user from a second virtual group associated with the target session group; and the audio-video interaction system sends an exit message of the target user to other session users that are in the second virtual group and not in the target session group, to enable the other session users not in the target session group to stop pulling an audio-video stream of the target user.

In implementation, when a target user wants to exit a target session group, the target user may send an exit request for a target session group to the audio-video interaction system, and after receiving the exit request, the audio-video interaction system may remove the target user from the target session group. Then, the audio-video interaction system may determine whether the target session group is associated with a virtual group, and if the target session group is associated with a virtual group, the audio-video interaction system may also remove the target user from the second virtual group associated with the target session group, and generate an exit message including a user identifier, a stream-pulling address and other user information of the target user and send the exit message to other session users that are in the second virtual group and not in the target session group, to enable each of the other session users that are not in the target session group to stop pulling an audio-video stream of the target user, and delete an interaction window corresponding to the target user. The target user may stop pulling audio-video streams of all session users, and delete all interaction windows.

Alternatively, the audio-video interaction system may determine whether the session user has exited according to a keep-alive state of a session user. Corresponding processing may be as follows: The audio-video interaction system detects a keep-alive state of a target user; if the keep-alive state of the target user is non-alive, the audio-video interaction system determines that the target user has exited, and removes the target user from the target session group and stops detection; if the target session group is associated with a virtual group, the audio-video interaction system removes the target user from the second virtual group associated with the target session group; and the audio-video interaction system sends an exit message of the target user to other session users that are in the second virtual group and not in the target session group, to enable the other session users not in the target session group to stop pulling an audio-video stream of the target user.

In implementation, after the target user joins the target session group, the audio-video interaction system may detect a keep-alive state of the target user, so as to determine whether the target user has exited from the target session group according to the keep-alive state of the target user. If detecting that the state of the target user is alive, the audio-video interaction system normally pulls and pushes the audio-video streams. If detecting that the state of the target user is non-alive, for example, that a network fault or a program fault occurs, the audio-video interaction system determines that the target user has exited, and then may remove the target user from the target session group and stop detection. Afterward, the audio-video interaction system may further determine whether the target session group is associated with a virtual group, and if the target session group is associated with a virtual group, the audio-video interaction system may remove the target user from the second virtual group associated with the target session group, and generate an exit message of the target user and send the exit message to other session users that are in the second virtual group and not in the target session group, to enable each of the other session users that are not in the target session group to stop pulling an audio-video stream of the target user, and delete an interaction window corresponding to the target user. The target user may stop pulling audio-video streams of all session users, and delete all interaction windows.

Alternatively, the audio-video interaction system may perform permission verification on a session user initiating a group operation request, to determine whether to respond to the group operation request. Corresponding processing may be as follows: the audio-video interaction system receives a group operation request initiated by a session user, and performs permission verification on the session user; and if the verification succeeds, the audio-video interaction system performs processing corresponding to the group operation request, to respond to the group operation request; or if the verification fails, the audio-video interaction system rejects the group operation request.

The group operation request at least includes a virtual group creation request, a virtual group join request, a virtual group exit request, a virtual group destruction request, and a join request and an exit request for a session group.

In implementation, after a session user in a session group initiates a group operation request to the audio-video interaction system, the audio-video interaction system may perform permission verification on the session user to verify, for example, whether the session user has group operation permission corresponding to the session group or whether a parameter corresponding to the session user is normal. For example, for the virtual group creation request, the audio-video interaction system may verify whether the session user is an administrator of the session group, and whether the session user has permission to create a virtual group. If the session user passes the permission verification, the audio-video interaction system may perform, according to different group operation requests initiated by the session user, corresponding processing procedures to respond to the group operation requests initiated by the user; or if the session user does not pass the permission verification, the audio-video interaction system may reject the group operation request initiated by the user, and sends, to the session user based on Web Socket, a feedback indicating that the session user does not have permission to perform this operation.

Alternatively, the audio-video interaction system may discard group operation request that the user repeatedly sends in a short period of time. Corresponding processing may be as follows: the audio-video interaction system receives a group operation request initiated by a session user, and determines whether the same group operation request initiated by the session user has been received within a preset historical time period. If the same group operation request initiated by the session user has been received within the preset historical time period, the audio-video interaction system discards the group operation request; or if no same group operation request initiated by the session has been received within the preset historical time period, the audio-video interaction system performs the permission verification on the session user.

In implementation, considering that the user may trigger the sending of the group operation request multiple times in a short period of time when initiating the request, and to avoid repeated processing of the same group operation request, after receiving a group operation request initiated by a session user, the audio-video interaction system may first determine whether the same group operation request initiated by the session user has been received within a preset historical time period before the moment at which the group operation request is received. If the same group operation request initiated by the session user has been received within the preset historical time period before the moment at which the group operation request is received, the audio-video interaction system may determine that the group operation request is repeatedly sent, and discard the group operation request; or if no same group operation request initiated by the session user has been received within the preset historical time period before the moment at which the group operation request is received, the audio-video interaction system may perform permission processing on the session.

In this embodiment, an audio-video interaction system receives a virtual group creation request initiated by a first user, creates a first virtual group, and determines a first session group to which the first user belongs; the audio-video interaction system associates the first session group with the first virtual group, and adds all session users in the first session group to the first virtual group; when receiving a virtual group join request for the first virtual group initiated by a second user, the audio-video interaction system determines a second session group to which the second user belongs; the audio-video interaction system associates the second session group with the first virtual group, and adds all session users in the second session group to the first virtual group; and the audio-video interaction system sends a user list of the second session group to other session users that are in the first virtual group and not in the second session group, to enable the other session users not in the second session group to incrementally pull and play an audio-video stream according to the user list. In this way, on the one hand, the audio-video interaction system may associate a plurality of session groups that perform cross-group audio-video interaction to a same virtual group, and add session users in the plurality of session groups that perform cross-group audio-video interaction to the virtual group, so that the cross-group audio-video interaction can be realized between all session users in each session group, and a plurality of users may simultaneously interact with each other, thereby effectively improving user experience. On the other hand, when performing cross-group audio-video interaction, each session user in the virtual group may directly pull and play audio-video streams of all session users that participate in the cross-group audio-video interaction, without disconnecting the interaction connections of the original session groups, thereby further improving user experience.

Based on the same technical concept, an embodiment of the present disclosure further provides a group management layer, and the group management layer is configured to:

receive a virtual group creation request initiated by a first user and sent by an access layer, create a first virtual group, and determine a first session group to which the first user belongs;

associate the first session group with the first virtual group, and add all session users in the first session group to the first virtual group;

determine a second session group to which a second user belongs, when receiving a virtual group join request for the first virtual group initiated by the second user and sent by the access layer;

associate the second session group with the first virtual group, and add all session users in the second session group to the first virtual group; and send a user list of the second session group to other session users that are in the first virtual group and not in the second session group, to enable the other session users not in the second session group to incrementally pull and play an audio-video stream according to the user list.

Alternatively, the group management layer is further configured to:

determine a third session group to which a third user belongs, when receiving a virtual group exit request for the first virtual group initiated by the third user and sent by the access layer;

dissociate the third session group from the first virtual group, and remove all session users in the third session group from the first virtual group; and send a user list of the third session group to other session users that are in the first virtual group and not in the third session group, to enable the other session users not in the third session group to stop pulling audio-video streams of the third session group.

Alternatively, the group management layer is further configured to:

determine all session groups that have been associated with first virtual group, and dissociate the first virtual group from all the session groups, when receiving a virtual group destruction request for the first virtual group initiated by a fourth user and sent by the access layer; and delete user data corresponding to the first virtual group, and send a virtual group destruction message to each session user in the first virtual group, to enable each session user to stop pulling audio-video streams of other session groups in the first virtual group.

Alternatively, the group management layer is further configured to:

add a target user to a target session group, when receiving a join request for the target session group initiated by the target user and sent by the access layer;

add the target user to a second virtual group associated with the target session group, if the target session group is associated with a virtual group; and send a join message of the target user to other session users that are in the second virtual group and not in the target session group, to enable the other session users not in the target session group to pull and play an audio-video stream of the target user.

Alternatively, the group management layer is further configured to:

remove a target user from a target session group, when receiving an exit request for the target session group initiated by the target user and sent by the access layer;

remove the target user from the second virtual group associated with the target session group, if the target session group is associated with a virtual group; and send an exit message of the target user to other session users that are in the second virtual group and not in the target session group, to enable the other session users not in the target session group to stop pulling an audio-video stream of the target user.

Based on the same technical concept, an embodiment of the present disclosure further provides an access layer, and the access layer is configured to:

receive a group operation request initiated by a session user, and perform permission verification on the session user; and provide the group operation request to the group management layer if the permission verification succeeds; or discard the group operation request if the permission verification fails.

Herein, the group operation request at least includes a virtual group creation request, a virtual group join request, a virtual group exit request and a virtual group destruction request, and a join request and an exit request for a session group.

Alternatively, the access layer is further configured to:

detect a keep-alive state of a target user, and if the keep-alive state of the target user is non-alive, determine that the target user has exited, and send an exit request for the session group of the target user to the group management layer.

Alternatively, the access layer is specifically configured to:

determine whether the group operation request corresponds to a virtual group, if the permission verification succeeds; and store the group operation request to a preset virtual group request queue, if the group operation request corresponds to a virtual group; or store the group operation request to a preset session group request queue, if the group operation request does not correspond to a virtual group.

Herein, the virtual group request queue and the session group request queue may be respectively configured to store a group operation request for the virtual group and a group operation request for the session group, and the group management layer may access the virtual group request queue and the session group request queue.

Alternatively, the access layer is specifically configured to:

receive the group operation request initiated by the session user, and determine whether the same group operation request initiated by the session user has been received within a preset historical time period; and discard the group operation request, if the same group operation request initiated by the session user has been received within the preset historical time period; or perform the permission verification on the session user, if no same group operation request initiated by the session user has been received within the preset historical time period.

Based on the same technical concept, an embodiment of the present disclosure further provides a system for multi-group audio-video interaction, and the system includes the group management layer and the access layer.

Figure 5:
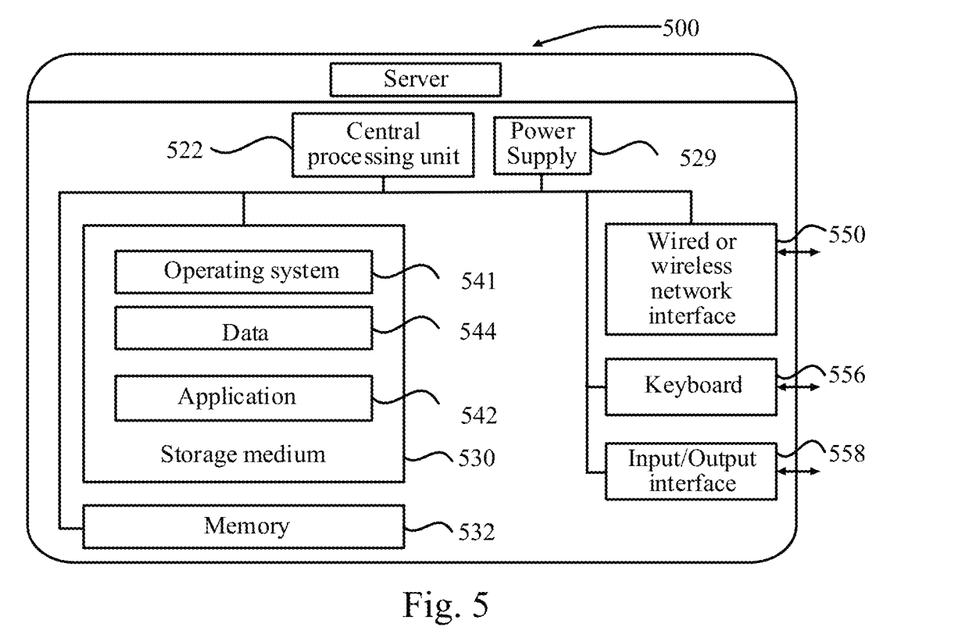
FIG. 5 is a schematic structural diagram of a server provided in an embodiment of the present disclosure.

FIG. 5 is a schematic structural diagram of a server according to an embodiment of the present disclosure. The server 500 may vary greatly due to different configurations or performance, and may include one or more central processing units (CPU) 522 (for example, one or more processors) and memories 532, and one or more storage media 530 (for example, one or more mass storage devices) storing application programs 542 or data 544. The memory 532 and the storage medium 530 may be transitory or persistent storage. The program stored in the storage medium 530 may include one or more modules (not shown), and each module may include a series of instructions and operations for the ingress acceleration node 500. Further, the central processing unit 522 may be configured to communicate with the storage medium 530, and execute, on the server 500, a series of instructions and operations in the storage medium 530.

The server 500 may further include one or more power supplies 529, one or more wired or wireless network interfaces 550, one or more input/output interfaces 558, one or more keyboards 556, and/or one or more operating systems 541, for example, Windows Server, Mac OS X, Unix, Linux, or FreeBSD.

The server 500 may include a memory and one or more programs, where the one or more programs are stored in the memory, and one or more processors, where the one or more processors are configured to execute the one or more programs including instructions for performing the method for multi-group audio-video interaction.

Those skilled in the art may understand that all or some steps that realize the above-described embodiments may be implemented through hardware, or may be implemented by instructing related hardware through a program which may be stored in a computer readable storage medium. The storage medium may be a read-only memory, a disk, or a compact disc.

The above-described are only preferably embodiments of the present disclosure, but are not used to impose a limitation to the present disclosure. Any amendment, equivalent substitution and improvement made within the spirit and principle of the present disclosure shall be included in the protection scope of the present disclosure.

What is claimed is:

1. A method for multi-group audio-video interaction, comprising:

receiving, by an audio-video interaction system, a virtual group creation request initiated by a first user, creating a first virtual group, and determining a first session group to which the first user belongs;

associating, by the audio-video interaction system, the first session group with the first virtual group, and adding all session users in the first session group to the first virtual group;

determining, by the audio-video interaction system, a second session group to which a second user belongs, when receiving a virtual group join request for the first virtual group initiated by the second user;

associating, by the audio-video interaction system, the second session group with the first virtual group, and adding all session users in the second session group to the first virtual group; and sending, by the audio-video interaction system, a user list of the second session group to other session users that are in the first virtual group and not in the second session group, to enable the other session users not in the second session group to incrementally pull and play an audio-video stream according to the user list.

2. The method according to claim 1, further comprising:

determining, by the audio-video interaction system, a third session group to which a third user belongs, when receiving a virtual group exit request for the first virtual group initiated by the third user;

dissociating, by the audio-video interaction system, the third session group from the first virtual group, and removing all session users in the third session group from the first virtual group; and sending, by the audio-video interaction system, a user list of the third session group to other session users that are in the first virtual group and not in the third session group, to enable the other session users not in the third session group to stop pulling an audio-video stream of the third session group.

3. The method according to claim 2, further comprising:

receiving, by the audio-video interaction system, a group operation request initiated by a session user, and performing permission verification on the session user; and performing, by the audio-video interaction system, processing corresponding to the group operation request to respond to the virtual group operation request, if the verification succeeds; or rejecting, by the audio-video interaction system, the group operation request, if the verification fails;

wherein the group operation request at least comprises a virtual group creation request, a virtual group join request, a virtual group exit request, a virtual group destruction request, and a join request and an exit request for a session group.

4. The method according to claim 1, further comprising:

determining, by the audio-video interaction system, all session groups that have been associated with first virtual group, and dissociating the first virtual group from all the session groups, when receiving a virtual group destruction request for the first virtual group initiated by a fourth user; and deleting, by the audio-video interaction system, user data corresponding to the first virtual group, and sending a virtual group destruction message to each session user in the first virtual group, to enable the each session user to stop pulling audio-video streams of other session groups in the first virtual group.

5. The method according to claim 4, further comprising:

receiving, by the audio-video interaction system, a group operation request initiated by a session user, and performing permission verification on the session user; and performing, by the audio-video interaction system, processing corresponding to the group operation request to respond to the virtual group operation request, if the verification succeeds; or rejecting, by the audio-video interaction system, the group operation request, if the verification fails;

wherein the group operation request at least comprises a virtual group creation request, a virtual group join request, a virtual group exit request, a virtual group destruction request, and a join request and an exit request for a session group.

6. The method according to claim 1, further comprising:
adding, by the audio-video interaction system, a target user to a target session group, when receiving a join request for the target session group initiated by the target user;
adding, by the audio-video interaction system, the target user to a second virtual group associated with the target session group, if the target session group is associated with a virtual group; and
sending, by the audio-video interaction system, a join message of the target user to other session users that are in the second virtual group and not in the target session group, to enable the other session users not in the target session group to pull and play an audio-video stream of the target user.

7. The method according to claim 6, further comprising:
removing, by the audio-video interaction system, the target user from the target session group, when receiving an exit request for the target session group initiated by the target user;
removing, by the audio-video interaction system, the target user from the second virtual group associated with the target session group, if the target session group is associated with a virtual group; and
sending, by the audio-video interaction system, an exit message of the target user to other session users that are in the second virtual group and not in the target session group, to enable the other session users not in the target session group to stop pulling an audio-video stream of the target user.

8. The method according to claim 6, after adding the target user to the target session group, further comprising:
detecting, by the audio-video interaction system, a keep-alive state of the target user, and if the keep-alive state of the target user is non-alive, determining, by the audio-video interaction system, that the target user has exited, and removing the target user from the target session group and stopping detection;
removing, by the audio-video interaction system, the target user from the second virtual group associated with the target session group, if the target session group is associated with a virtual group; and
sending, by the audio-video interaction system, an exit message of the target user to other session users that are in the second virtual group and not in the target session group, to enable the other session users not in the target session group to stop pulling an audio-video stream of the target user.

9. The method according to claim 6, wherein the method further comprises:
receiving, by the audio-video interaction system, a group operation request initiated by a session user, and performing permission verification on the session user; and performing, by the audio-video interaction system, processing corresponding to the group operation request to respond to the virtual group operation request, if the verification succeeds; or
rejecting, by the audio-video interaction system, the group operation request, if the verification fails;
wherein the group operation request at least comprises a virtual group creation request, a virtual group join request, a virtual group exit request, a virtual group destruction request, and a join request and an exit request for a session group.

10. The method according to claim 1, further comprising:
receiving, by the audio-video interaction system, a group operation request initiated by a session user, and performing permission verification on the session user; and
performing, by the audio-video interaction system, processing corresponding to the group operation request to respond to the virtual group operation request, if the verification succeeds; or rejecting, by the audio-video interaction system, the group operation request, if the verification fails;
wherein the group operation request at least comprises a virtual group creation request, a virtual group join request, a virtual group exit request, a virtual group destruction request, and a join request and an exit request for a session group.

11. The method according to claim 10, wherein the step of receiving, by the audio-video interaction system, a group operation request initiated by a session user, and performing permission verification on the session user comprises:
receiving, by the audio-video interaction system, the group operation request initiated by the session user, and determining whether the same group operation request initiated by the session user has been received within a preset historical time period; and
discarding, by the audio-video interaction system, the group operation request, if the same group operation request initiated by the session user has been received within the preset historical time period; or performing, by the audio-video interaction system, the permission verification on the session user, if no same group operation request initiated by the session user has been received within the preset historical time period.

12. A method for multi-group audio-video interaction, applied to a group management layer of an audio-video interaction system, comprising:
receiving a virtual group creation request initiated by a first user and sent by an access layer, creating a first virtual group, and determining a first session group to which the first user belongs;
associating the first session group with the first virtual group, and adding all session users in the first session group to the first virtual group;
determining a second session group to which a second user belongs, when receiving a virtual group join request for the first virtual group initiated by the second user and sent by the access layer;
associating the second session group with the first virtual group, and adding all session users in the second session group to the first virtual group; and
sending a user list of the second session group to other session users that are in the first virtual group and not in the second session group, to enable the other session users not in the second session group to incrementally pull and play an audio-video stream according to the user list.

13. The method according to claim 12, further comprising:
- determining a third session group to which a third user belongs, when receiving a virtual group exit request for the first virtual group initiated by the third user and sent by the access layer;
- dissociating the third session group from the first virtual group, and removing all session users in the third session group from the first virtual group; and
- sending a user list of the third session group to other session users that are in the first virtual group and not in the third session group, to enable the other session users not in the third session group to stop pulling an audio-video stream of the third session group.

14. The method according to claim 12, further comprising:
- determining all session groups that have been associated with first virtual group, and dissociating the first virtual group from all the session groups, when receiving a virtual group destruction request for the first virtual group initiated by a fourth user and sent by the access layer; and
- deleting user data corresponding to the first virtual group, and sending a virtual group destruction message to each session user in the first virtual group, to enable the each session user to stop pulling audio-video streams of other session groups in the first virtual group.

15. The method according to claim 12, further comprising:
- adding a target user to a target session group, when receiving a join request for the target session group initiated by the target user and sent by the access layer;
- adding the target user to a second virtual group associated with the target session group, if the target session group is associated with a virtual group; and
- sending a join message of the target user to other session users that are in the second virtual group and not in the target session group, to enable the other session users not in the target session group to pull and play an audio-video stream of the target user.

16. The method according to claim 15, further comprising:
- removing the target user from the target session group, when receiving an exit request for the target session group initiated by the target user and sent by the access layer;
- removing the target user from the second virtual group associated with the target session group, if the target session group is associated with a virtual group; and
- sending an exit message of the target user to other session users that are in the second virtual group and not in the target session group, to enable the other session users not in the target session group to stop pulling an audio-video stream of the target user.

17. A method for multi-group audio-video interaction, applied to an access layer of an audio-video interaction system, comprising:
- receiving a group operation request initiated by a session user, and performing permission verification on the session user; and
- providing the group operation request to a group management layer if the permission verification succeeds; or discarding the group operation request if the permission verification fails;
- wherein the group operation request at least comprises a virtual group creation request, a virtual group join request, a virtual group exit request and a virtual group destruction request, and a join request and an exit request for a session group.

18. The method according to claim 17, further comprising:
- detecting a keep-alive state of a target user, and if the keep-alive state of the target user is non-alive, determining that the target user has exited, and sending an exit request for the session group of the target user to the group management layer.

19. The method according to claim 17, wherein providing the group operation request to the group management layer if the permission verification succeeds comprises:
- determining whether the group operation request corresponds to a virtual group if the permission verification succeeds;
- storing the group operation request to a preset virtual group request queue, if the group operation request corresponds to a virtual group; or storing the group operation request to a preset session group request queue, if the group operation request does not correspond to a virtual group.

20. The method according to claim 17, wherein receiving a group operation request initiated by a session user, and performing permission verification on the session user comprises:
- receiving the group operation request initiated by the session user, and determining whether the same group operation request initiated by the session user has been received within a preset historical time period; and
discarding the group operation request, if the same group operation request initiated by the session user has been received within the preset historical time period; or performing the permission verification on the session user, if no same group operation request initiated by the session user has been received within the preset historical time period.

* * * * *